United States Patent [19]

Kurke et al.

[11] Patent Number: 5,244,301
[45] Date of Patent: Sep. 14, 1993

[54] BICYCLE SEAT MOUNT

[76] Inventors: Martin I. Kurke; Charles R. Kurke, both of 121 Penn St., El Segundo, Calif. 90245

[21] Appl. No.: 949,024

[22] Filed: Sep. 22, 1992

[51] Int. Cl.⁵ ............................................. B62J 1/00
[52] U.S. Cl. .................................... 403/390; 403/87; 403/97; 297/215.15
[58] Field of Search ............... 403/390, 389, 391, 384, 403/388, 87, 97; 297/195

[56] References Cited

U.S. PATENT DOCUMENTS

| | | | |
|---|---|---|---|
| 3,891,333 | 6/1975 | Corderc'k | 297/195 |
| 4,142,813 | 3/1979 | Laborde | 403/391 |
| 4,568,121 | 2/1986 | Kashima | 297/195 |
| 4,783,119 | 11/1988 | Moses | 297/195 |
| 4,836,604 | 6/1989 | Romano | 403/87 |
| 4,983,063 | 1/1991 | Phillips | 403/87 |

FOREIGN PATENT DOCUMENTS

| | | | |
|---|---|---|---|
| 2409182 | 7/1979 | France | 297/195 |
| 347817 | 4/1937 | Italy | 297/195 |

*Primary Examiner*—Randolph A. Reese
*Assistant Examiner*—Anthony Knight
*Attorney, Agent, or Firm*—Erik M. Arnhem

[57] ABSTRACT

A bicycle seat mount includes an arcuate saddle welded to the upper end of a tubular post for supporting a two-piece clamping assembly. A clamping bolt extends upwardly through the saddle and aligned slots in the clamping members into meshed engagement with a specially constructed nut seated in an arcuate recess in the upper surface of the upper clamping member. The nut is rockably engaged with the clamping member so as to achieve a desired pressure engagement with the clamping member surface in various adjusted positions of the clamping assembly.

14 Claims, 2 Drawing Sheets

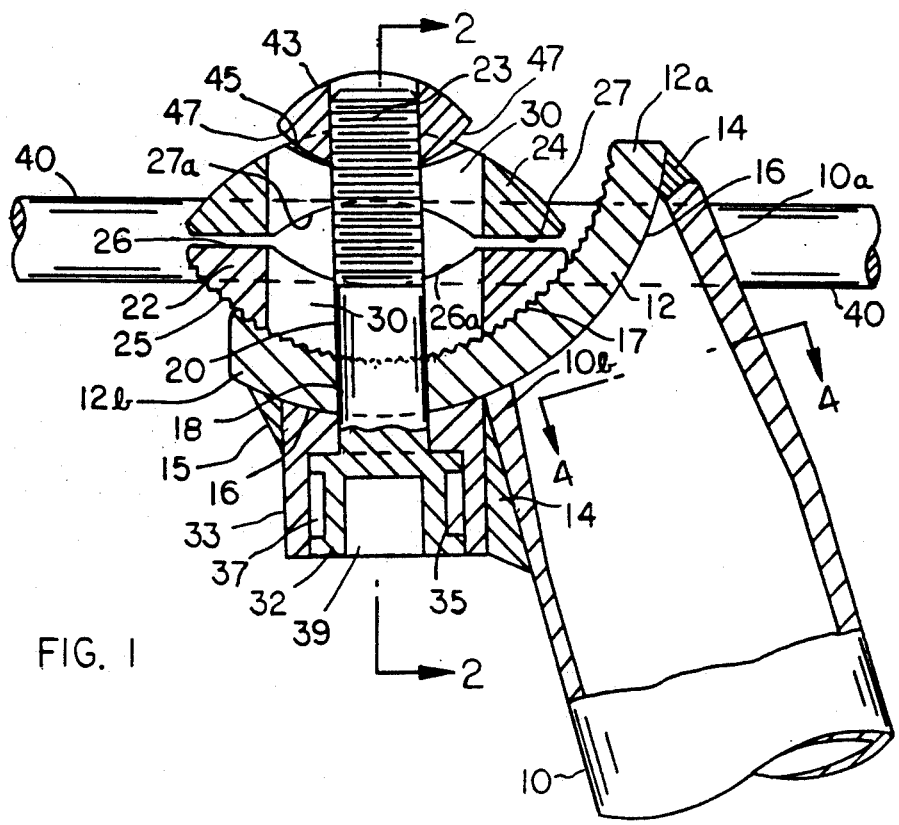
FIG. 1
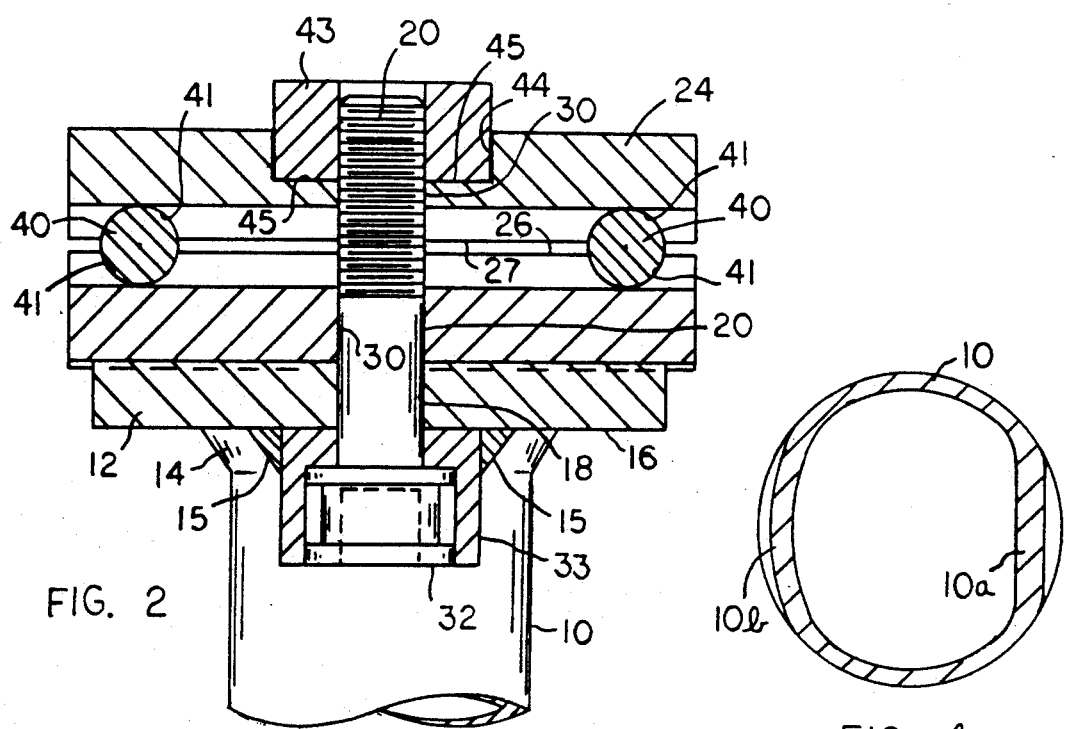
FIG. 2
FIG. 4

BICYCLE SEAT MOUNT

BACKGROUND OF THE INVENTION

1. Field of the Invention

This invention relates to bicycles, and particularly to a mechanism for adjustably mounting a bicycle seat (or saddle) to the frame of the bicycle.

2. Prior Developments

Various mechanisms have been proposed for adjustably mounting a bicycles seat so that the seat can be tilted into different selected positions, depending on the needs and desires of individual bicyclists. U.S. Pat. No. 3,992,054, issued to T. Campagnolo on Nov. 16, 1976, shows a bicycle seat mount that includes a specially constructed head located on the upper end of a tubular post. The upper surface of the head is convexly curved to form a seating surface for a first lower clamp member for exerting a clamp force on two parallel seat support wires extending within mating grooves in the opposed clamp members. A clamp bolt extends upwardly through the aforementioned head and lower clamp member into a threaded opening in the upper clamp member. The head has a divergent slot that permits the bolt to take different directions, for thereby adjusting the degree of seat tilt.

U.S. Pat. No. 4,421,357, issued to K. Shimano on Dec. 20, 1983, shows a bicycle seat mount, wherein the clamp extends through a thick washer; an auxiliary set screw is threaded through the head portion of the bicycle post to engage a side surface of the washer, thereby holding the bolt in selected positions of seat-tilt adjustment.

U.S. Pat. No. 4,502,811, issued to J. Potriarca on Mar. 5, 1985, discloses a bicycle seat mount that comprises a shoe having a convexly curved upper surface for supporting a lower clamping member. A bolt extends upwardly through the shoe and lower clamping member into a threaded opening in an upper clamping member. The patentee indicates that the clamping members can be slidably adjusted on the shoe, although such adjustment might not in fact be possible. A boss on the underside of the shoe would appear to restrict adjustment of the clamping bolt, as would be required to permit slidable movement of the clamp member assembly.

SUMMARY OF THE INVENTION

The present invention relates to a bicycle seat mount, wherein the seat can be selectively set in different adjusted positions tilted either upward or downward from an intermediate horizontal position. In one preferred form of the invention the seat mount comprises an arcuate saddle affixed to the upper end of an upstanding tubular post. The upper surface of the saddle is concavely curved and serrated in a direction normal to the direction of surface curvature. A clamp member assembly includes a lower clamp member that has a serrated lower surface convexly curved to mate with the serrations on the saddle upper surface; the clamp member assembly can thus be adjusted arcuately along the saddle upper surface.

A clamping bolt extends upwardly through the saddle and clamp member assembly into a nut that is seated in an arcuate recess in the upper surface of the upper clamp member. The lower surface of the nut is arcuate, whereby the nut can rock on the arcuate surface of the recess, whereby the clamp member assembly can be held in a range of different adjusted positions on the saddle.

The component parts of the seat mount assembly are proportioned so that the seat can be tiltably adjusted to have a relatively wide range of positions, tilted either upwardly or downwardly from a horizontal position.

In order to provide a strong seat mount construction the saddle is affixed to the tubular post by means of a continuous weld extending along the saddle lower surface and around the upper end of the post; the post is thickened locally at two diammetrically spaced points to provide an increased weld contact area at points of highest stress.

The clamping bolt has a head portion that is housed within a socket of the saddle. The socket member protects the head portion of the bolt from the weather elements; additionally the socket member provides a high strength mounting structure for the bolt, and an ornamental shroud around the bolt head. In a preferred form of the invention the socket member is affixed to the saddle by a continuous weld going around the socket member side surface.

The major component parts of the seat mount construction are preferably aluminum extrusions heat treated and machined, as necessary. Color can be imparted to the alumuminum surfaces by an anodizing process. The clamping bolt is preferably formed of high strength titanium.

One advantageous feature of the seat mount is a relatively low overall weight, due partly to the fact that the component parts can be constructed as relatively small devices while effectively achieving the desired seat-mount function.

THE DRAWINGS

FIG. 1 is a fragmentary sectional view taken through a bicycle seat mount constructed according to the invention.

FIG. 2 is a transverse sectional view taken on line 2—2 in FIG. 1.

FIG. 4 is a transverse sectional view taken on line 4—4 in FIG. 1.

DESCRIPTION OF A PREFERRED EMBODIMENT OF THE INVENTION

Figure 3:
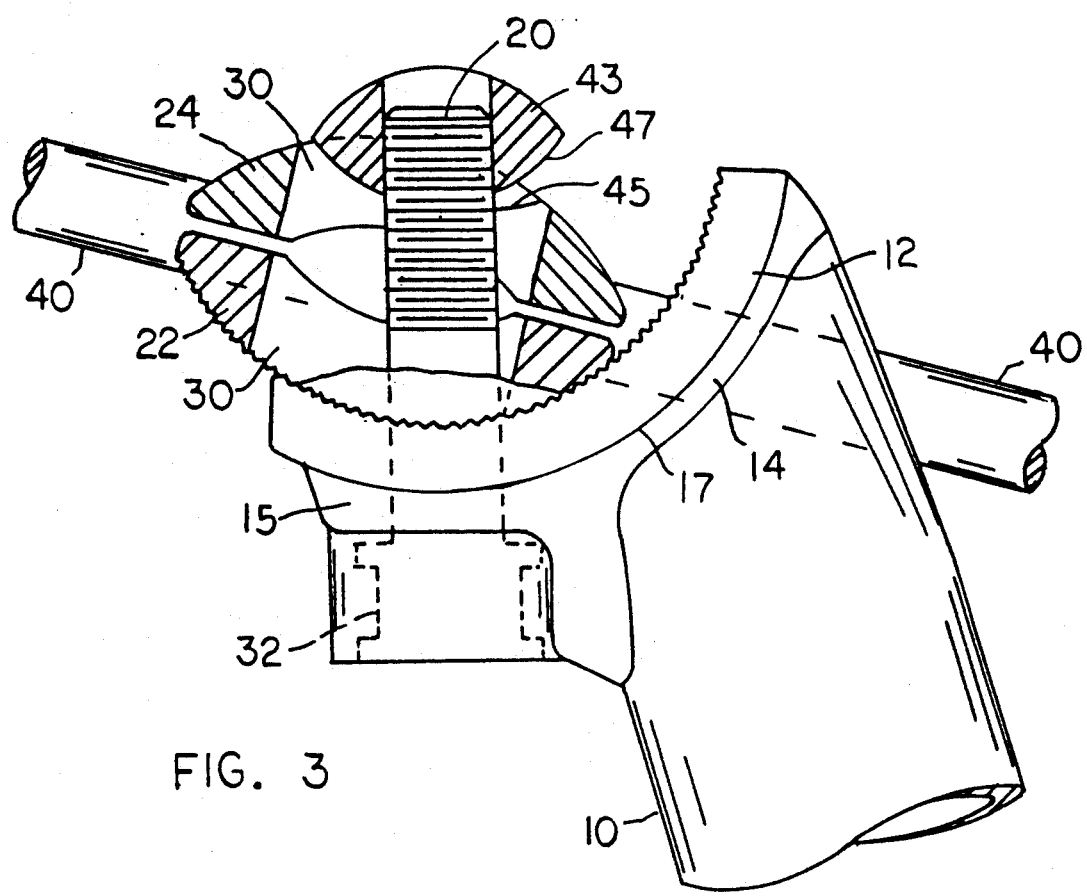
FIG. 3 is a side elevational view of the FIG. 1 seat mount, with parts broken away to show interior details, and an adjusted position of the clamping members.

FIGS. 1 and 2 illustrate a bicycle seat mount that includes an upstanding post 10, preferably formed out of drawn aluminum tubing having, for example about one inch diameter and a wall thickness of about 0.05 inch (except that localized sections of the tubing near its upper end are thickened to facilitate a strong welded connection to an associated saddle). The tubular post may have a length of about fourteen inches, such that its lower end can be telescopically inserted into a bicycle frame, not shown. As shown in FIG. 1, post 10 is installed in the bicycle frame so that it is tilted slightly; the bicycle rear wheel would be located to the left of post 10, and the bicycle front wheel would be located to the right of the post in FIG. 1, so that the bicycle faces to the right.

An arcuate saddle 12 is secured to the upper end of post 10, as by a continuous weld 14 extending around the post along the saddle lower surface 16. Saddle 12 is preferably formed out of an aluminum extrusion having the arcuate cross section depicted in FIG. 1. The extrusion is cut to a predetermined transverse length (normal to the plane of the paper in FIG. 1), after which a circular hole 18 is drilled therethrough for accommodation of a clamping bolt 20. As shown in FIG. 1, the axis of the bolt is approximately vertical.

Saddle 12 comprises a curved front portion 12a overlying the upper end of post 10, and a curved tail portion 12b extending rearwardly beyond the post. Corner areas of the saddle at tail portion 12b can be cut away in order to reduce the saddle weight and to add an ornamental distinctiveness to the saddle appearance. The upper end portion of tubular post 10 is thickened, as at 10a and 10b, to strengthen the tube at its points of maximum stress, i.e. along the longitudinal axis of the bicycle seat. The localized thickening of the post also increases the tube end surface area in contact with weld 14, thereby somewhat improving the strength of the weld connection at the points of maximum stress.

Thickening of the tubular post, as at 10a and 10b, can be achieved by deforming the tube material inwardly toward the tube axis, preferably by using two axially-acting dies engaged respectively, against the tube inner and outer surfaces. As the dies move axially toward each other into a telescoped condition the tube wall material is reformed into the non-uniform thickness condition depicted in FIGS. 1 and 4.

Saddle 12 is oriented so that its extreme front end is elevated above its intermediate portion, such that the saddle is tilted away from the post, i.e. to left in FIG. 1. The tilted condition of the saddle is advantageous in that space is provided to the left of post 10 for accommodating the clamping bolt 20 without unduly increasing the arcuate length of the saddle; also, the associated clamping members 22 and 24 can be relatively flat, small, light weight devices.

Saddle 12 has a curved lower surface 16 and a curved upper surface 17, both of said surfaces having a common center of curvature designated by numeral 23 in FIG. 1. Surfaces 16 and 17 are thus concentric relative to each other, so that the saddle has an essentially constant wall thickness from its front portion 12a to its rear portion 12b. Typically the saddle wall thickness will be about 0.18 inch. The upper surface 17 of the saddle is serrated to provide a good gripping action on the lower clamping member 22.

As seen in FIG. 1, clamping member 22 has a convexly curved lower surface 25 that is serrated to mate with the serrations formed in saddle surface 17. The upper surface 26 of clamping member 22 is essentially flat, except that the central area of surface 26 has a slight concave dished configuration, as shown at 26a in FIG. 1. The dish configuration extends the full width of member 22.

The upper clamping member 24 has a flat lower surface 27 that is centrally dished, as at 27a. The upper surface of clamping member 24 is convexly curved so as to have the same radius of curvature as surface 25 on clamping member 22. Both clamping members have the same configuration in side elevation (FIG. 1); each clamping member can be an aluminum casting or an aluminum extrusion, machined to form aligned longitudinal through slots 30 sized to slidably accommodate the shank portion of bolt 20. The length dimension of each slot 30 (as seen in FIG. 1) is more than twice the diameter of the bolt shank, whereas the width dimension of each slot 30 (as seen in FIG. 2) is the same as the bolt shank diameter, such that the slot side surfaces have a slidably fit on the bolt side surface.

Bolt 20 includes a head portion 32 that is circular in transverse cross section. A hollow socket member 33 is welded to saddle 12 to form a housing or shroud around head portion 32 of the bolt. Socket member 33 has a circular hole aligned with hole 18, and a cylindrical socket surface 35 conforming to the circular side surface of the bolt head portion, whereby the bolt can be turned freely without interference from the socket member.

Bolt 20 is preferably formed of high strength titanium. To somewhat reduce the cost of the bolt the bolt head portion 32 can have an annular groove 37 in its circular side surface; the overall strength of the bolt is not affected by the presence of groove 37. A non-circular (preferably hexagonal) wrench opening 39 is formed in the lower end surface of the bolt head. The bolt may thus be turned by inserting an allen wrench into opening 39.

Socket member 33 is formed of aluminum, and is secured to the lower surface of saddle 12 by a continuous annular weld 15 extending around the socket member circumference. At the joint between socket member 33 and tubular post 10 the two welds 14 and 15 merge together. The socket member is located so that bolt 20 has its rotational axis passing through the aforementioned center of curvature 23 for saddle surfaces 16 and 17.

The bicycle seat, not shown, is equipped with two parallel support rods or wires 40 that are accommodated in semi-circular cross-sectioned grooves 41 in the confronting surfaces 26 and 27 of the two clamping members 22 and 24. Each groove 41 is parallel to the plane of the aforementioned slots 30. Also, the two sets of grooves are equidistant from slots 30 so that the slot 30 plane is equidistant from both sets of grooves. Grooves 41 extend the full length of clamping members 22 and 24. However, because central areas of members 22 and 24 are dished, as at 26a and 27a, the grooves have reduced depths in the dished areas of the clamping member confronting surfaces. Clamp forces will be exerted on wires 40 primarily at, or near, the ends of the clamping members remote from the dished areas 26a and 27a.

A nut 43 is engaged with clamping member 24 to exert a clamping pressure thereon. The nut is seated in an arcuate recess 44 that defines a curved seating surface 45. As seen in FIG. 2, recess 44 extends laterally in opposite directions from the associated slot 30 so that arcuate surfaces 45 constitute concave arcuate shoulders located alongside slot 30 (i.e. on both sides of the slot).

The lower surface 47 of nut 43 is convexly curved so that the nut is capable of rocking motion on the arcuate seating surfaces 45. The rocking motion is possible because the radius of curvature of nut surface 47 is less than the radius of curvature of shoulder surfaces 45.

Members 22 and 24 are clamped to the seat support wires 40 by manual rotation of bolt 20. A wrench is inserted into wrench opening 39 to turn the bolt. Nut 43 is thus threaded onto the bolt threads to apply a clamping force to seating shoulder surfaces 45.

The two clamping members 22 and 24 can have various different adjusted positions on saddle 12. FIG. 1 shows members 22 and 24 in a position wherein the seat support wires 40 are essentially horizontal. FIG. 3 shows members 22 and 24 in a second position wherein the seat support wires 40 are angled (or tilted) downwardly and forwardly; the seat (not shown) will be similarly tilted. The serrations on saddle surface 17 and clamping member surface 25 hold the clamping member assembly in any selected position of adjustment (as determined by the lengths of slots 30).

The rockable relation between convex nut surface 47 and concave shoulder surfaces 45 is advantageous in that the nut will have sufficient surface area engagement with shoulder surfaces 45 in any selected position of adjustment of the clamping member assembly. The engaged surfaces 45 and 47 will have a relatively long service life without premature gouging or wear. Also, the range of seat tilt adjustment is relatively great. In one particular case the support wires 40 could be tilted downwardly at an angle of approximately seventeen degrees or upwardly at an angle in excess of six degrees.

The illustrated bicycle seat mount can be constructed out of relatively small components. Clamping members 22 and 24 are relatively flat so as to nest within the concavity of saddle 12. As viewed in side elevation the clamp member assembly (members 22 and 24) has an oval "football" configuration.

The drawings shown specific structural configurations and features useful in one embodiment of the invention. However, it will be appreciated that the invention can be practiced in various forms and structural configurations.

What is claimed is:

1. A bicycle seat mount, comprising:
   an upstanding post having an upper end;
   an arcuate saddle having a lower surface secured to the upper end of said post; said saddle having a curved concave serrated upper surface;
   a lower clamping member having a convexly curved serrated lower surface mated to the serrated surface of said saddle;
   an upper clamping member overlying said lower clamping member; said clamping members having confronting surfaces; each confronting surface having two parallel grooves therein adapted to accommodate the support wires of a bicycle seat; each clamping member having a single slot therein located midway between the associated grooves; said clamping members having their respective slots aligned in a common plane extending midway between two planes defined by the parallel grooves;
   said upper clamping member having an upper surface, and an arcuate recess inset into said clamping member upper surface; said arcuate recess being centered on the slot in the upper clamping member to form two concave arcuate shoulders located alongside the associated slot;
   a clamping bolt extending through said saddle on an imaginary line going through the center of curvature of the saddle curved upper surface;
   a clamping nut seated in said arcuate recess; said nut having a curved convex lower surface engaged with said concave arcuate shoulders; the radius of curvature of the nut lower surface being less than the radius of curvature of the arcuate shoulders, whereby the nut can rock on the shoulders;
   said clamping bolt having a shank portion extending through the aligned slots in said clamping members into said nut, whereby the bolt can be turned to bring the nut into pressure engagement with the upper clamping member; and said slots having width dimensions that are the same as the diameter of the bolt, and length dimensions that are appreciably greater than the bolt diameter, whereby said clamping members can be arcuately adjusted along the serrated upper surface of the saddle.

2. The bicycle seat mount of claim 1, wherein central areas of the confronting surfaces on said clamping members are dished, whereby the clamping forces are exerted on the bicycle seat wires primarily near end areas of the clamping members remote from said central areas.

3. The bicycle seat mount of claim 1, wherein the length dimension of each slot is more than twice the slot width dimension.

4. The bicycle seat mount of claim 1, and further comprising a socket member secured to the lower surface of said saddle at a point offset from the upper end of said post; said bolt having a head portion thereof housed within said socket member.

5. The bicycle seat mount of claim 4, wherein the lower surface of said saddle is curved so as to be concentric with the saddle upper surface.

6. The bicycle seat mount of claim 4, wherein the shank portion of said bolt is rotatably seated by means of a circular hole extending through the saddle and an aligned hole in the socket member.

7. The bicycle seat mount of claim 4, wherein the head portion of said bolt has a circular cross section; said socket member having a cylindrical socket surface conforming to the circular cross section of the bolt head portion; said head portion having an annular groove in its circular side surface; said head portion of the bolt having an end surface; and a non-circular wrench opening in said end surface; said bolt being formed of titanium.

8. The bicycle seat mount of claim 4, wherein said saddle is joined to the post and the socket member by means of two continuous welds extending along the saddle lower surface around the post and socket member.

9. The bicycle seat mount of claim 4, wherein the lower surface of said saddle is curved so as to be concentric with the saddle upper surface; said post comprising a tubular element having an upper end conforming to the curved lower surface of the saddle; the upper end of said tubular element having a first portion thereof elevated relative to a second diammetridally disposed portion, whereby the saddle is tilted away from the defined post.

10. The bicycle seat mount of claim 9, wherein said tubular element comprises an annular wall that is thickened at its upper end in the vicinity of said first elevated portion and said second diammetrically disposed portion.

11. The bicycle seat mount of claim 10, wherein said annular wall is thickened by deforming the wall radially inwardly toward the axis of the tubular element.

12. The bicycle seat mount of claim 11, wherein said saddle is joined to said tubular element and said socket member by means of two continuous welds extending along the saddle lower surface around the tubular member and socket member.

13. The bicycle seat mount of claim 1, wherein said clamping members form a clamp member assembly having an oval football configuration in side elevation.

14. The bicycle seat mount of claim 13, wherein said clamping members are similarly configured in a plane taken parallel to the slot plane.

* * * * *